Feb. 1, 1949.  G. M. RAPP  2,460,309
PANEL STRUCTURAL UNIT
Filed Nov. 19, 1942
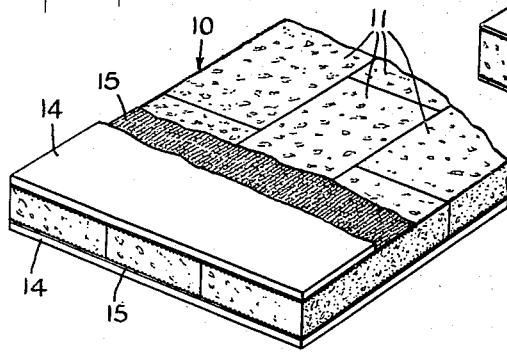
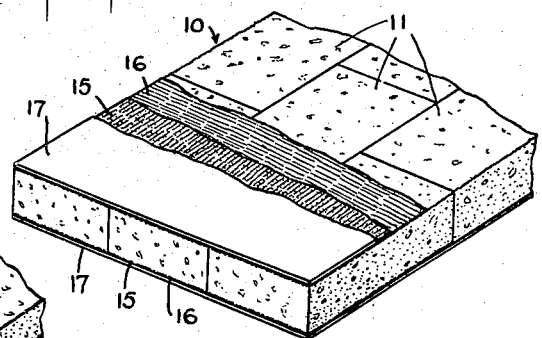
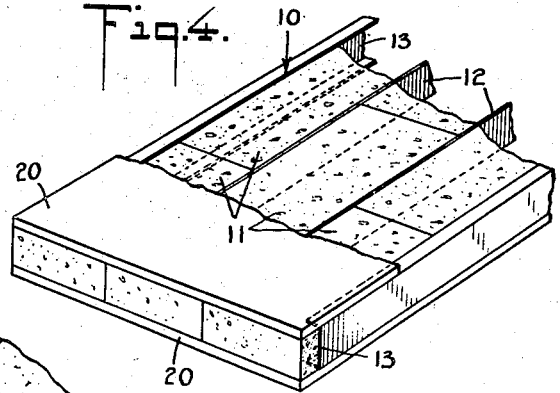
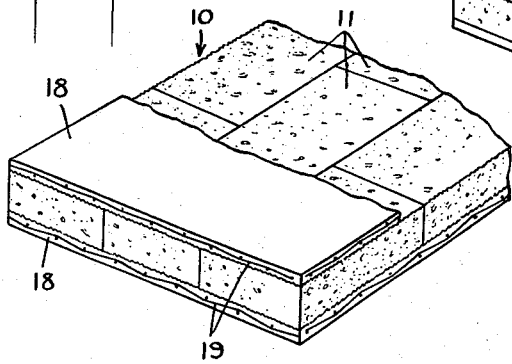
INVENTOR
George M. Rapp
HIS ATTORNEY Patented Feb. 1, 1949

2,460,309

UNITED STATES PATENT OFFICE 2,460,309

PANEL STRUCTURAL UNIT

George M. Rapp, New Haven, Conn., assignor to John B. Pierce Foundation, New York, N. Y., a corporation of New York Application November 19, 1942, Serial No. 466,123

5 Claims. (Cl. 154—45.9)

This invention relates to structural laminates, and particularly to structural sandwich panel material for use in building construction.

Structural laminates are coming into use more and more in the building industry as the demand for relatively large-sized structural panels possessing special attributes, such as great strength, weather resistance, and good thermal insulating qualities, increases. The low-cost housing field especially, with its tendency toward prefabrication and, in war-time and other emergencies, toward readily demountable prefabricated construction, calls for relatively large-sized panel structural units which are strong and solid, yet comparatively light in weight, and which provide a high degree of thermal insulation.

It is a primary object of this invention, therefore, to provide an improved structural laminate which possesses all the qualities desired in building construction (especially in the field of low-cost prefabricated housing) namely, relative low-cost, great tensile and flexural strength, rigidity, light-weight, high thermal insulation, excellent resistance to weather and moisture, good fire-resistance, and safety against insects, such as termites, as well as against fungus growths.

The above is achieved in preferred forms of the invention by utilizing inorganic materials substantially entirely. Many of the desirable qualities may be obtained pursuant to the invention, however, by the use of both organic and inorganic materials.

An outstanding feature of the invention resides in the use of a plurality of cellular glass blocks, or material of similar porous and light-weight nature, as a backing or core for dense and hard surfacing material, which may be rigid sheeting such as the ordinary asbestos-cement composition board. As an example of other low-density material which may be used for the core, there is cited the highly porous, light-weight, inorganic material disclosed in U. S. Patent No. 1,932,971 issued to Erik Huttemann and Wolfgang Czernin under date of October 31, 1933.

Cellular glass is an excellent insulating material, and is unique in that it combines low heat capacity with great durability and impermeability to water and water vapor, such properties being due to its inorganic composition and the sealed nature of its voids. In addition, no treatment is required to render its fire-retardant, fungicidal, or insecticidal, these qualities being inherent. From a thermal insulating standpoint, it has a low density, low thermal conductivity, and a volumetric specific heat, or heat storage capacity, which is considerably less than is possessed by other insulating materials.

But cellular glass suffers from a structural standpoint in being highly frangible, of unfinished appearance, and relatively small-sized in formation. Its surfaces present networks of open cells having thin, rigidly elastic, glass walls of a highly frangible nature.

It is an object of this invention, then, to so surface the cellular glass backing or core as to eliminate the structural deficiencies thereof, and to render the cellular glass useful as a structural panel material for exterior walls of buildings and other purposes requiring strength, resistance against impact, and smooth, finished facings.

In accomplishing the above object, the invention provides for bonding, or otherwise intimately securing together a number of the relatively small blocks of cellular glass to form a broad core of panel formation suitable in size for structural purposes. It also provides, in one preferred form, for applying to one or more surfaces of the so-formed panel core a chemically hard-setting plastic material, of suitable character, which fills the surface voids of the cellular glass and prepares the same for the application of core-sandwich sheets.

Such applied plastic material should be compatible structurally with the cellular glass, that is, a material which sets and hardens with only slight, if any, expansion or shrinkage.

The core-sandwiching sheets are bonded to the cellular glass, and must have high tensile strength and high modulus of elasticity for the purpose of distributing applied loads to all parts of the sandwiched core. The adhesive material used as the bonding agent must have high shear bond strength such as have many well-known types of asphalt-resin compositions, or has a flexibilized, cold-setting, urea formaldehyde resin adhesive. Constructed in this manner the composite cellular glass core serves as an active load-supporting component of the panel sandwich material.

Further objects and features of the invention will be apparent from the following detailed description of the several preferred embodiments illustrated in the accompanying drawing.

In the drawing:

Fig. 1 represents a perspective view, looking from above, of an end portion of a panel structural unit of the invention, which illustrates a preferred form of the structural laminate of the invention;

Fig. 2, a similar view of a corresponding panel structural unit illustrating another form of the structural laminate of the invention;

Fig. 3, a similar view of a corresponding panel structural unit illustrating yet another form of the structural laminate of the invention; and Fig. 4, a similar view of a corresponding panel structural unit illustrating still another form of the structural laminate of the invention.

In the several figures of the drawing, sandwich panel structural units are illustrated which, in each instance utilize a panel core of cellular glass blocks or the like.

In providing the cellular glass core for the panel structural unit, it is preferred to utilize rectangular-shaped blocks of cellular glass in number sufficient to provide the desired length and breadth for the panel, and of thickness corresponding to the desired total thickness of the core.

The several cellular glass cores 10, illustrated in Figs. 1 through 4 as component parts of various panel structural units, are made up of rectangular-shaped, cellular glass blocks 11, staggered relative to one another.

In the panel structural units of Figs. 1 through 3, the plurality of blocks 11 of the respective cores are fitted directly together and are bonded into a unitary, rigid relationship by means of a suitable bonding agent, such as asphalt resin compositions or flexibilized, cold-setting, urea formaldehyde resin adhesive.

In the panel structural unit of Fig. 4, longitudinal inner strips 12 and longitudinal, channel-shaped outer strips 13 of thin gage material possessing high tensile strength and high modulus of elasticity, such as vulcanized fibre, are provided for increasing the shear strength of the unit. These longitudinal strips are each continuous in length, and are each preferably of a width substantially commensurate with the thickness of the core. They are preferably held in place by the same bonding agent employed for uniting the plurality of cellular glass blocks, and may extend the full length of the core or only part of the length, depending upon the characteristics desired in the resulting structural unit.

The panel structural unit of Fig. 1 embodies surfacings of preformed asbestos cement board bonded to the cellular glass core 10. The sheets of asbestos cement board, designated 14, are permanently bonded to the core 10 by a suitable adhesive 15. It should be realized that the cellular glass core is rigidly elastic with a high modulus of elasticity, and that, therefore, both the asbestos cement board and the bonding adhesive, when set, must have a substantially corresponding high modulus of elasticity. The bonding adhesive must also be compatible with the core material so that it does not impart destructive stresses and strains either during the stage of initial set or later due to variations in temperature.

It is preferred that the asbestos cement board have a Portland cement content of not less than 65 per cent by weight.

Instead of being pre-formed as rigid sheet material, the asbestos cement composition may be applied to the cellular glass core 10 in a wet, plastic, uncured state over an underlayment of a thermoplastic or bituminous substance, preferably emulsified asphalt. Such uncured composition material is then cured in place, to form the facing sheets.

Thin resin-bonded plywood or any other preformed sheet or membranous material having high tensile strength and high modulus of elasticity may be substituted for either one or both of the asbestos cement surfacing boards 14.

The panel structural unit illustrated in Fig. 2 embodies a chemically hard-setting plastic material 16 as a filler for the surface voids of the cellular glass core 10. Gypsum is preferred in this capacity because of its compatibility, structurally, with the cellular glass of the core. Other similar materials which set and harden with only slight, if any, expansion may be employed, however. The use of this filler provides a smooth plane surface on the cellular glass core for subsequent lamination, and supports the frangible glass walls of the surface voids.

Here, relatively thin gage, weather-resistant sheets 17 of synthetic resin or other plastic material, for example, .032 inch phenolic or urea-formaldehyde plastic, or vulcanized fibre, is secured to the filled surfaces of the core 10 by means of adhesive 15, which may be as aforedescribed, but which is preferably a thermoplastic, or a thermosetting resin.

The actual lamination may be carried out, and a permanent bond produced, by either one or the other of the so-called hot-press or cold-press methods well known in the art, or by any equivalent method.

It has been found advantageous to apply a synthetic resin sheet to one broad face of the core 10, and a vulcanized fibre sheet of similar thin gage to the opposite broad face, but it is obvious that various combinations of various suitable materials may be found advantageous in particular instances.

In Fig. 3 is illustrated a panel structural unit wherein the finish surfacing is "plastered" directly to the cellular glass core 10. The resulting dense hard coatings are designated 18.

Reinforcing material, preferably steel wire mesh 19, is incorporated in the body of the surfacings during the plastering on of the surfacing material.

Where one broad face of the panel unit is to be outside in the building construction, and the other broad face is to be inside, it is advantageous that the surfacing on the inside be a hard white plaster whose setting and hardening characteristics are such that no volume changes, so great as to be injurious to the cellular glass, will occur.

A preferred plaster mixture for the interior surfacing consists of one part by weight of lime hydrate, one part by weight of calcined, autoclaved gypsum, such as "Hydrostone," and water in such quantity as required to give the mixture a proper consistency. Other plaster mixtures, however, of hydrated lime and common "first settle" gypsum, with a retarder as selected and proportioned for minimum volume change, may be also found satisfactory. In all such plaster mixtures, the final net shrinkage shall be less than .02 per cent when measured in the free or unrestrained condition.

If a relatively thin coating of some suitable plastic material, such as emulsified asphalt, be first applied to the cellular glass core, it is possible to use for the surfacing a mixture of the ordinary mortar type consisting of Portland cement, hydrated lime, sand and water. An example of suitable proportions is one part Portland cement, one part hydrated lime, and five parts sand. The thin, plastic under-coating, applied directly to the cellular glass core, as above described, should be one which is compatible with the exterior mortar surfacing.

The panel structural unit of Fig. 4 may embody, as the surfacing for the reinforced, cellular glass core 10, any of these various surfacings described in connection with the panel structural units of the prior figures. The surfacing in the illustrated instance is designated 20.

Whereas this invention is illustrated and described with respect to preferred specific embodiments thereof, it should be realized that various changes may be made in such specific embodiments and various other embodiments may be constructed by those skilled in the art without departing from the spirit and generic scope of the invention as set forth herein and in the claims that here follow.

I claim:

1. Structural sandwich panel material for use in building construction, comprising in combination a low-density core of panel formation composed of a plurality of highly porous, frangible blocks arranged side-by-side and end-to-end and firmly united by a bonding agent; and dense, rigid sheet surfacing possessing high tensile strength and high modulus of elasticity bonded to opposite panel faces of said core, substantially coextensively therewith so that the sandwich panel material exists as a continuously integrated and unitary structural entity in which both core and surfacings are adapted to participate and interact in carrying loads.

2. The combination set forth in claim 1 wherein the highly porous, frangible blocks are arranged in staggered formation.

3. The combination set forth in claim 1 wherein the highly porous, frangible blocks are cellular glass.

4. The combination set forth in claim 1 wherein the sheet surfacings comprise pre-formed rigid sheets which are bonded to the panel faces of the core.

5. The combination set forth in claim 1 wherein the sheet surfacings are monolithic and cementitious in character and of the type which have been cured in place from plastic to solid state, and wherein structural reinforcing mesh is incorporated within said surfacings, giving them high tensile strength and high modulus of elasticity.

GEORGE M. RAPP.

REFERENCES CITED

The following references are of record in the file of this patent:

UNITED STATES PATENTS

| Number | Name | Date |
|---|---|---|
| 1,589,512 | Clapp | June 22, 1926 |
| 1,709,035 | Payne | Apr. 16, 1929 |
| 1,817,022 | Slidell et al. | Aug. 4, 1931 |
| 1,831,897 | Wagner | Nov. 17, 1931 |
| 2,067,312 | Coryell | Jan. 12, 1937 |
| 2,105,613 | Poston | Jan. 18, 1938 |
| 2,122,696 | Poston | July 5, 1938 |
| 2,152,190 | Henderson | Mar. 28, 1939 |
| 2,205,534 | Lytle | June 25, 1940 |
| 2,305,684 | Foster | Dec. 22, 1942 |
| 2,310,442 | Knudsen | Feb. 9, 1943 |

FOREIGN PATENTS

| Number | Country | Date |
|---|---|---|
| 171,417 | Great Britain | Nov. 7, 1921 |

OTHER REFERENCES

Chemistry and Industry, "The use of plastics in building," by R. J. Schaffer, Aug. 22, 1942, pp. 357–361.